US008613058B2

(12) United States Patent
Beyer et al.

(10) Patent No.: US 8,613,058 B2
(45) Date of Patent: Dec. 17, 2013

(54) SYSTEMS, METHODS AND COMPUTER PROGRAM PRODUCTS FOR PROVIDING ADDITIONAL AUTHENTICATION BEYOND USER EQUIPMENT AUTHENTICATION IN AN IMS NETWORK

(75) Inventors: Loraine Beyer, Hoover, AL (US); Amy Zwarico, Mountain Brook, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1402 days.

(21) Appl. No.: 11/756,025

(22) Filed: May 31, 2007

(65) Prior Publication Data

US 2008/0301785 A1    Dec. 4, 2008

(51) Int. Cl.
*H04L 29/06* (2006.01)
(52) U.S. Cl.
USPC .............................. 726/5; 713/168; 380/247
(58) Field of Classification Search
USPC ................. 380/247; 713/168; 726/5
See application file for complete search history.

(56) References Cited

U.S. PATENT DOCUMENTS

2005/0102501 A1* 5/2005 Haukka et al. ............... 713/168
2005/0278420 A1* 12/2005 Hartikainen et al. ......... 709/203
2006/0182280 A1* 8/2006 Laitinen et al. ............... 380/247
2007/0050365 A1* 3/2007 Laitinen et al. ................. 707/9
2008/0160959 A1* 7/2008 Huang et al. .................. 455/411

OTHER PUBLICATIONS

Global System for Mobile Communications, Technical Specification ETSI TS 133 220 V7.6.0, European Telecommunications Standards Institute, pp. 1-72 (2006); http://www.etsi.orq.
Universal Mobile Telecommunications System (UMTS), Technical Specification ETSI TS 133 102 V7.0.0, European Telecommunications Standards Institute, pp. 1-64 (2005); http://www.etsi.org.

* cited by examiner

*Primary Examiner* — Kambiz Zand
*Assistant Examiner* — Thong Truong
(74) *Attorney, Agent, or Firm* — Myers Bigel Sibley & Sajovec, PA

(57) ABSTRACT

A communication network provides access to a network service by providing an additional level of authentication beyond device level authentication. Operations include receiving a message at a Bootstrapping Server Function (BSF) from User Equipment (UE) that additional authentication beyond UE authentication is required for UE access to a network service, and performing an authentication protocol between the BSF and a Home Subscriber System (HSS) to authenticate an identity associated with the UE responsive to receiving the message.

12 Claims, 5 Drawing Sheets

SYSTEMS, METHODS AND COMPUTER PROGRAM PRODUCTS FOR PROVIDING ADDITIONAL AUTHENTICATION BEYOND USER EQUIPMENT AUTHENTICATION IN AN IMS NETWORK

BACKGROUND OF THE INVENTION

The present invention relates generally to communication networks and, more particularly, to delivering services via communication networks.

The Internet Protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. IMS may be characterized as a standardized way to connect IP devices and networks using SIP.

Referring to FIG. 1, an exemplary communication network 100 includes an IMS network 105 that is coupled to packet switching network(s) 110 and circuit switched network(s) 120, which may provide connectivity to the IMS network 105 for devices 10, 20, such as cell phones, WiFi-equipped computing devices, conventional telephones, modems, and other devices. A device may connect to the IMS network 105 using any of a number of different interfaces, generally depending on the nature of the device. The devices 10, 20 may include IP devices that are capable of communicating via SIP.

The IMS network 105 includes apparatus configured to provide a variety of different functions linked by standardized interfaces. Generally, functions of the IMS network 105 include a bundle of functions of SIP servers or proxies, collectively referred to as a Call Session Control Function (CSCF), which are used to process SIP signaling packets in the IMS network 105. Functions of the CSCF may include: registration of devices with the IMS network 105; routing and inspection of signaling messages; authentication of users and establishment of security associations; compression, decompression and other signal processing functions; authorization of resources; policy enforcement; bandwidth management; and generation of charging records. These functions may be apportioned among several call session control function proxies or servers, such as a Proxy-CSCF (P-CSCF) 130, Media Gateway Control Function (MGCF) 150, Interrogating-CSCF (I-CSCF), Serving-CSCF (S-CSCF), and various other functions, gateways and the like.

The P-CSCF 130 may be configured as a SIP proxy to function as an interface to the IMS network 105 for IP terminals/devices 10, 20. The P-CSCF 130 may enable the registration of IP terminals/devices and the routing of SIP and/or HTTP signaling messages between the devices 10, 20 and service providers, such as the SIP Service Provider 170. The P-CSCF 130 may communicate with devices 10 via the packet network(s) 110 and may communicate with devices 20 via MGCF 150, a media gateway 180, and circuit switched network(s) 120. The MGCF 150 may enable SIP signaling to inter-work with other types of signaling used by the media gateway 180. Thus, the combination of the MGCF 150 and the media gateway 180 may provide an interface between the SIP signaling used in the IMS network 105 and the signaling used in the circuit switched network(s) 120.

A Home Subscriber Server (HSS) database 190 may maintain a service profile and other information for each end-user and associated IP terminal/device that has registered with the IMS network 105. The profile and other information may include, but is not limited to, IP address information, roaming information, and/or telephony services information.

The devices 10 and/or 20 may desire to access a Web or browser based service. A Web service is a reusable piece of software that interacts by exchanging messages over a network. Commonly, Web services use Simple Object Access Protocol (SOAP), a protocol for exchanging XML-based messages. A common messaging pattern in SOAP is the Remote Procedure Call (RPC) pattern, in which one a Web service requester sends a request message to a Web Service Provider, and the Web Service Provider sends a response message that provides the requested service, for example, the result of applying a particular procedure based on parameters passed in the Web service request.

Generally, it is desirable that a Web service have some type of authentication capability, such that unauthorized access to the service may be prevented. A variety of different authentication techniques may be used for Web services, including transmission of credentials to the Web Service Provider with or without encryption, digest techniques in which credentials may be hashed on the client and server and the results compared, and third party certificate approaches wherein a user requests and installs a certificate from a trusted third party (e.g., Verisign, Entrust, etc.), and the Web Service Provider can query the third party to verify credentials as required.

SUMMARY

Some embodiments of the present invention provide methods of operating a communication network to provide access to a network service. Operations include receiving a message at a Bootstrapping Server Function (BSF) from User Equipment (UE) that additional authentication beyond UE authentication is required for UE access to a network service, and performing an authentication protocol between the BSF and a Home Subscriber System (HSS) to authenticate an identity associated with the UE responsive to receiving the message.

In other embodiments, performing the authentication protocol comprises receiving UE authentication credentials from the UE at the BSF, sending a prompt from the BSF to the UE for identity information, receiving the identity information from the UE at the BSF, and sending the identity information and the UE authentication credentials to the HSS.

In still other embodiments, performing the authentication protocol further comprises authenticating the identity information at the HSS, and notifying the BSF that the identity information has been authenticated.

In still other embodiments, performing the authentication protocol further comprises associating the authenticated identity information with the UE authentication credentials at the BSF, and informing the UE that the authenticated identity information has been associated with the UE authentication credentials.

In still other embodiments, performing the authentication protocol further comprises changing an expiration time of key material used to authenticate the UE.

In still other embodiments, changing the expiration time of the key material comprises changing the expiration time of the key material based on instructions associated with a Network Application Function (NAF) that provides the network service and are stored on the HSS.

In still other embodiments, the UE authentication credentials reference the key material with the changed expiration time along with information associated with a communication session between the UE and a Network Application Function (NAF) that provides the network service.

In still other embodiments, the method further comprises receiving a request initiated from the UE that the association between the UE authentication credentials and the authenticated identity information be terminated, terminating the association between the UE authentication credentials and the authenticated identity information at the BSF, and notifying the UE that the association between the UE authentication credentials and the authenticated identity information has been terminated.

In still other embodiments, the identity information comprises a user identification and password/personal identification number combination, a secure identification, and a synchronous token, and/or biometric information.

In further embodiments, User Equipment (UE) may access a network service by sending a request for the network service to the Network Application Function (NAF), receiving a message that additional authentication beyond UE authentication is required to access to the network service, sending identity information associated with the UE to a Bootstrapping Server Function (BSF) for authentication thereof, and notifying the NAF that the BSF contains UE authentication credentials that have the authenticated identity information associated therewith.

In still further embodiments, sending the identity information comprises notifying the BSF that the additional authentication for accessing the network service is required, sending the UE authentication credentials to the BSF, receiving a prompt from the BSF for the identity information, and sending the identity information responsive to receiving the prompt.

In still further embodiments the identity information comprises a user identification and password/personal identification number combination, a secure identification, a synchronous token, and/or biometric information.

In still further embodiments, the method further comprises requesting that the association between the UE authentication credentials and the authenticated identity information be terminated, and receiving notification that the BSF has terminated the association between the UE authentication credentials and the authenticated identity information.

In other embodiments, a Network Application Function (NAF) is operated to provide a network service by receiving a request from User Equipment (UE) for the network service, notifying the UE that additional authentication beyond UE authentication is required for access to the network service responsive to receiving the request, receiving a request from the UE to obtain UE authentication credentials that have authenticated identity information associated therewith from a Bootstrapping Server Function (BSF), verifying that the BSF has the UE authentication credentials that have the authenticated identity information associated therewith, and providing the network service to the UE responsive to verifying that the UE authentication credentials have the authenticated identity information associated therewith.

In still other embodiments, the NAF is a first NAF and the network service is a first network service, the method further comprises receiving a request from the UE for a second network service at a second NAF, receiving the UE authentication credentials from the UE at the second NAF, sending the USE authentication credentials from the second NAF to the BSF, obtaining the authenticated identity information from the BSF based on the UE authentication credentials, and providing the second network service to the UE via the second NAF responsive to obtaining the authenticated identity information from the BSF.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
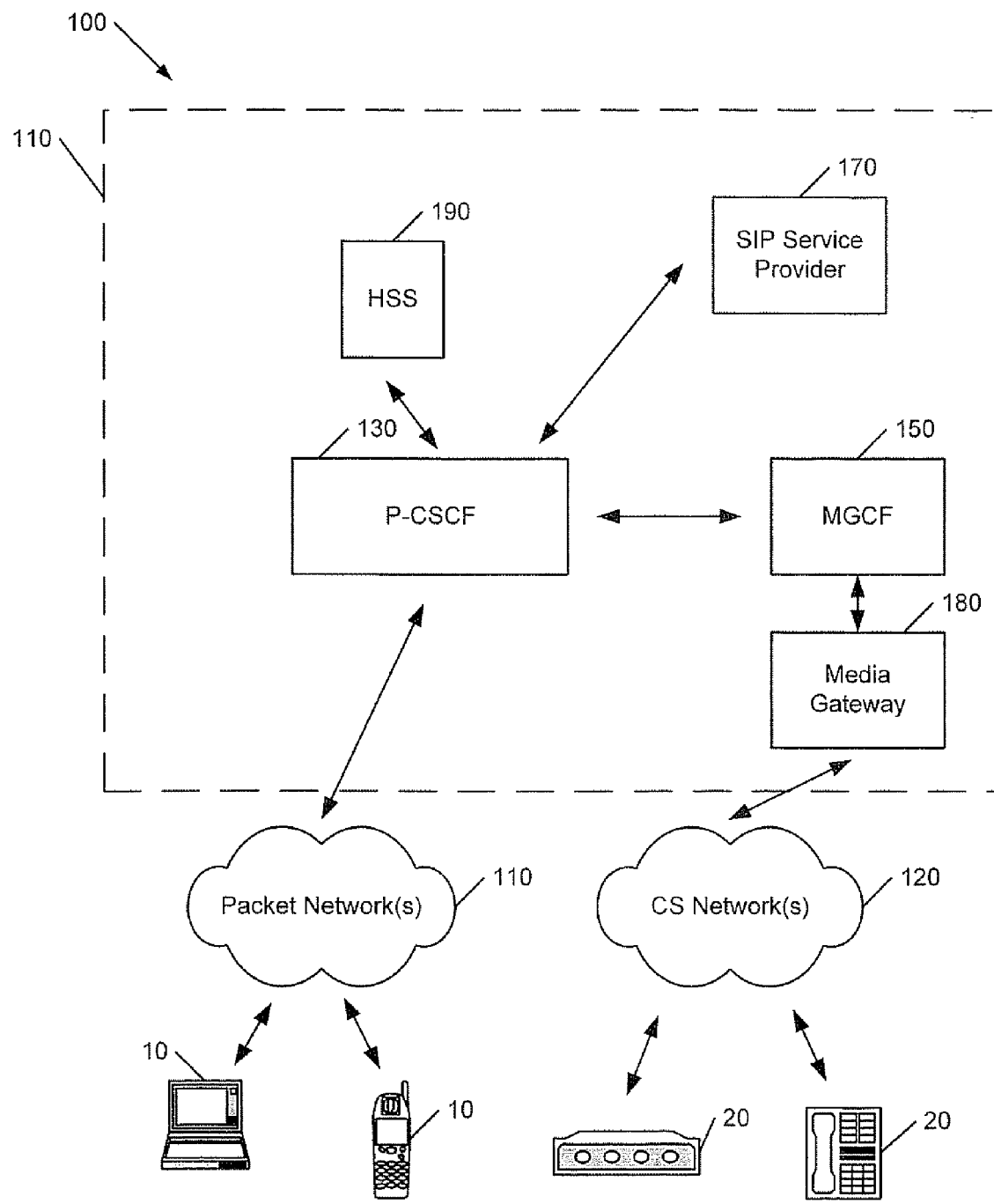
FIG. 1 is a block diagram of a conventional Internet Protocol (IP) Multimedia Subsystem (IMS) network.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will he understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "User Equipment (UE)" refers to a terminal or device that may communicate using the Session Initiation Protocol (SIP). It will be understood that UE may also refer to devices that communicate using SIP via a media gateway, which translates communications, for example, between an IP network and another network, such as the public switched telephone network or a circuit switched wireless network. As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

The Internet Protocol (IP) Multimedia Subsystem (IMS) allows devices to authenticate within the SIP domain using the HTTP Digest Authentication and Key Agreement (AKA) protocol. This level of authentication, i.e., device level of authentication, may be extended to the Web (HTTP) domain via the Generic Authentication Architecture (GAA) and the Generic Bootstrapping Architecture (GBA), which are part of the Third Generation Partnership Projects (3GPP and 3GPP2). The GBA may allow network operators to distribute subscriber certificates that may be used to authenticate devices before they access multimedia services and applications. Some embodiments of the present invention may extend the level of authentication beyond device authentication to include, for example, an identity authentication. For example, a mobile terminal may be authenticated in a network using the AKA protocol, but if a user of the mobile terminal visits a Web site to access a bank account, then some embodiments of the present invention may provide an additional level of authentication for the identity of the user to ensure that the account is not being accessed by an unauthorized person. Once this additional level of authentication has been established, it may be used in accessing other services during a single session thereby providing a "single sign on" service for an end user.

Figure 2:
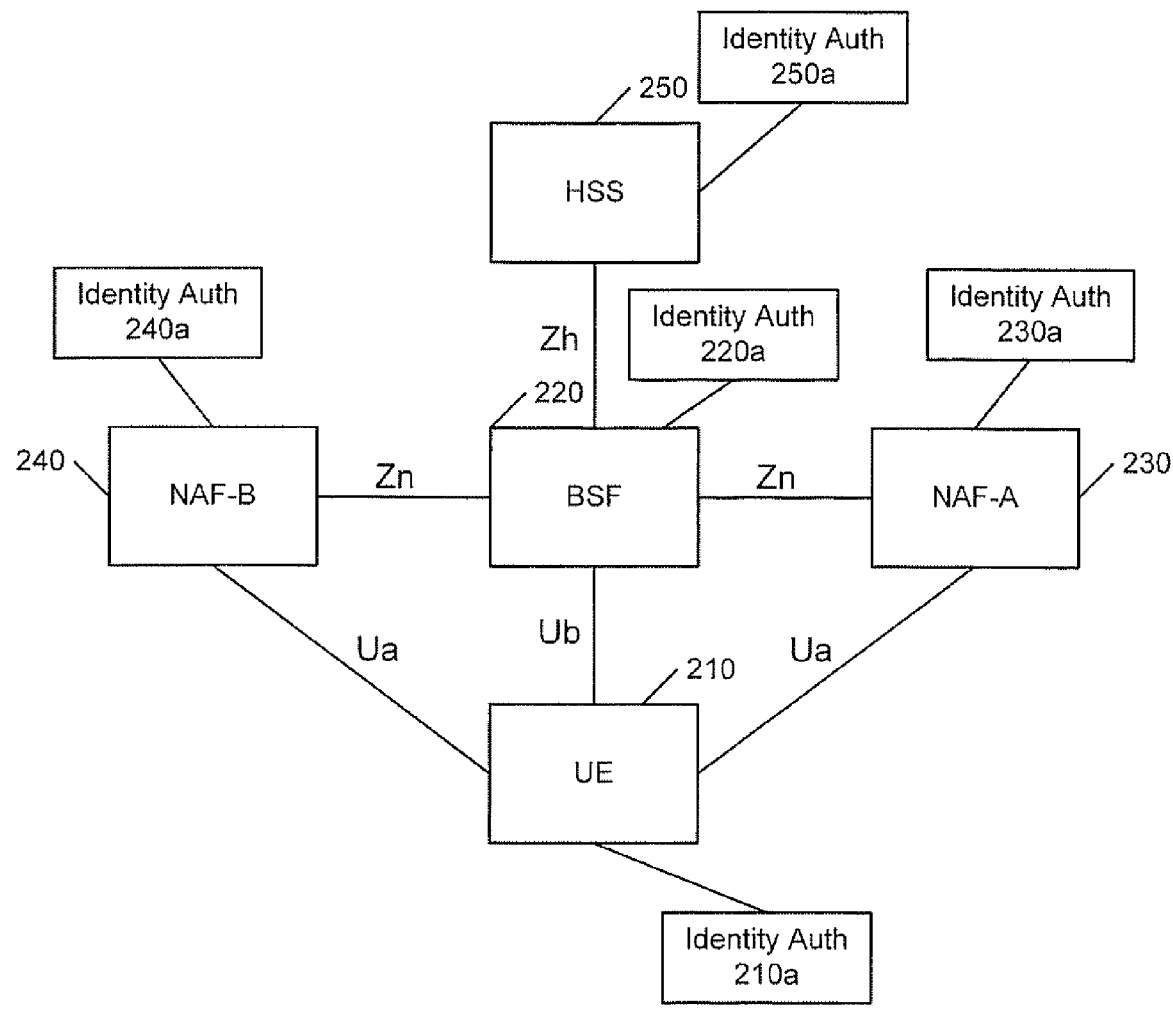
FIG. 2 is a block diagram that illustrates a 3GPP bootstrapping architecture for providing additional authentication beyond device authentication in an IMS network, in accordance with some embodiments of the present invention.

Referring to FIG. 2 an exemplary communication network architecture, in accordance with some embodiments of the present invention, comprises UE 210, a Bootstrapping Server Function (BSF) 220, a first Network Application Function (NAF-A) 230, a second Network Application Function (NAF-B) 240, and a Home Subscriber System (HSS) 250. The UE contains the hardware and/or software to support the HTTP Digest AKA protocol and any communication protocols that are used for communicating with the various NAFs in the network. The UE may contain a Universal Integrated Circuit Card (UICC), which contains the software and data for authenticating the UP in an IMS network so that the UE establishes an IMS Public Identity (IMPU), which is registered in the HSS 250.

The BSF 220 may be included in a network element that is managed by a network operator. The BSF 220, HSS 250, and UE 210 participate in the GBA authentication protocol in which shared key material is shared between the UE 210 and the network by running the bootstrapping procedure. For example, the BSF 220 may authenticate the UE 210 using the AKA protocol. The key information established during this device authentication procedure can then be used by the UE when accessing one or more NAFs. The BSF may restrict the lifetime of the key material and may also restrict the applicability of the key particular to particular NAFs by using a key derivation procedure.

NAF-A 230 and NAF-B 240 may provide one or more services to the UE 210 and may also communicate securely with the BSF 220. A NAF may also be referred to as an Application Server (AS). The HSS 250 maintains a service profile and other information for each end-user and associated UE that has registered with the network. The profile and other information may include, but is not limited to, IP address information, roaming information, and/or telephony services information.

The interface Ua specifies the application protocol between the UE 210 and NAF-A 230 and NAF-B 240, which is secured based on the shared key material obtained from running the AKA protocol to authenticate the UE 210 as well as the authentication of the identity of a user associated with the UE in accordance with some embodiments of the invention. The interface Ub specifies the protocol mutually authenticating the UE 210 and the BSF 220. To authenticate the UE 210, the 3GPP AKA protocol may be used. Some embodiments of the present invention provide additional authentication of an identity of a user associated with the UE. The interface Zn specifies the protocol used by an NAF 930, 240 to obtain key material agreed to between the UE 210 and BSF 220 in authenticating the UE 210, and used to obtain authenticated identity information associated with a user of the UE 210 from the BSF 220. The interface Zh specifies the protocol that the BSF 220 and HSS 250 use to communicate authentication information both at the device level and at a user identity level for the UE 210.

As shown in FIG. 2, each of the elements UE 210, BSF 220, NAF-A 230, NAF-B 240, and the HSS 250 includes an identity authentication module 210a, 290a, 230a, 240a, and 250a respectively. The various identity authentication modules may be configured to allow the network elements to perform a protocol in which an identity associated with the UE 210 is authenticated and this authenticated identity may be used to allow the UE 210 to access one or more services provided by one or more NAFs, such as NAF-A 230 and NAF-B 240.

In accordance with various embodiments of the present invention, the BSF 220, NAF-A 230, NAF-B 240, and/or HSS 250 may be implemented as part of a single entity that resides on a single server or is distributed across multiple servers.

The various elements of the communication network of FIG. 2 may be connected by a global network, such as the Internet or other publicly accessible network. Various elements of the network may be interconnected by a wide area network, a local area network, an Intranet, and/or other private network, which may not be accessible by the general public. Thus, the communication network may represent a combination of public and private networks or a virtual private network (VPN). Although FIG. 2 illustrates an exemplary communication network, it will be understood that the present invention is not limited to such configurations, but is intended to encompass any configuration capable of carrying out the operations described herein.

The present invention is described hereinafter with reference to message flow, flowchart and/or block diagram illustrations of methods, devices, and/or computer program products in accordance with some embodiments of the invention. These message flow, flowchart and/or block diagrams further illustrate exemplary operations for operating a communication network in which identity authentication, such as the identity of an end user, is provided in addition to UE or device level authentication. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Figure 3:
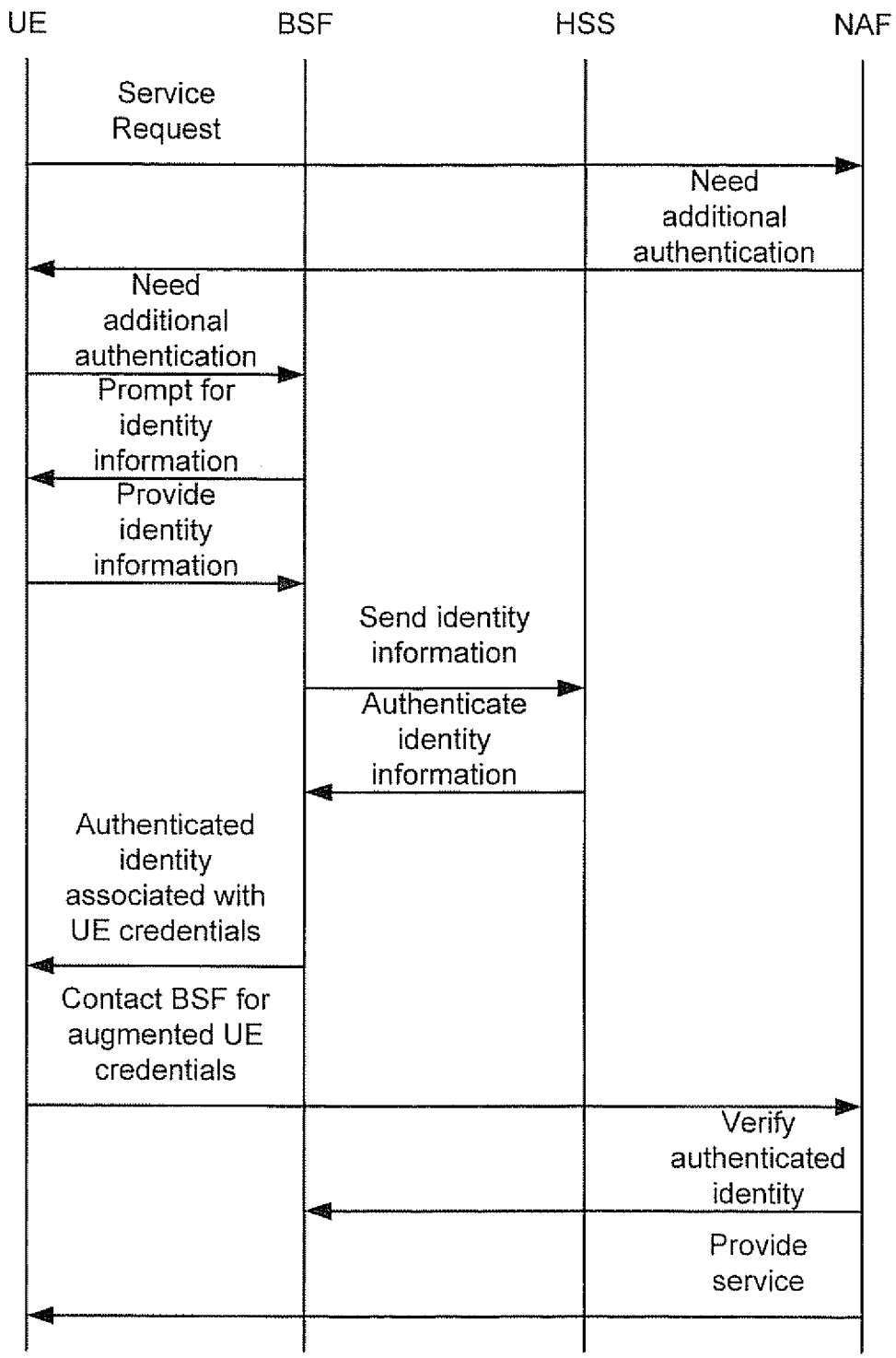
FIGS. 3-5 are message flow diagrams that illustrate operations for providing additional authentication beyond device authentication in an IMS network, in accordance with some embodiments of the present invention.

FIG. 3 is a message flow diagram that illustrates operations of a communication network in which identity authentication, such as the identity of an end user, is provided in addition to UE or device level authentication. Referring to FIGS. 3 and 2, when the UE 210 is powered on, it may go through a registration protocol with an IMS network such that an IMS Public Identity (IMPU) is registered in the HSS 250. The UE 210 sends a request to the NAF-A 200 to access, for example, a Web or browser based service or feature that requires additional authentication beyond UE level or device level authentication. The UE 210 sends the request to the NAF-A 230 using AKA protocol key material that is derived for securing the Ua interface between the UE 210 and the NAF-A 200.

The NAF-A 230 determines that the requested service or feature requires additional authentication instructs the UE 210 to return to the BSF 220 to provide user identity information, such as, for example, a user name and password. The UE 210 sends a message to the BSF 220 that additional authentication is required and includes the UE's authentication credentials, i.e., device level authentication credentials. The UE authentication credentials may be, for example, a Bootstrappping Transaction Identifier (B-TID), which is used in GBA networks to bind a UE identifier to the key material used in the Ua, Ub, and Zn interfaces.

The BSF 220 then prompts the UE 210 for the additional identity information that is associated with the UE 210. A user may provide the additional identity information through the UE by entering, for example, a user name and password or Personal Identification Number (PIN). In other embodiments, the additional identity information may be a SecureID, synchronous token, biometric information, or some other type of information desired by a service provider that operates the NAF-A 230.

The BSF 220 collects the additional identity information and sends it to the ISS 250 where it is compared with information stored thereon for the UE 210 to determine its authenticity. If this additional identity information is valid, then the HSS 250 informs the BSF 220 of the positive result and the BSF 220 augments the UE authentication credentials (e.g., B-TID) by associating the authenticated identity information therewith. In some embodiments of the present invention, the BSF 220 may change, e.g., shorten, the lifespan/expiry time of the AKA protocol key material that is derived for securing the Ua interface between the UE 210 and the NAF-A 230. For example, because the UE 210 may be authenticated for a specific user for a potentially private transaction on a NAF, it may be desirable shorten the time that the authentication is valid to reduce the risk of a security breach. In accordance with various embodiments of the present invention, the change to the lifespan of the AKA protocol key material may be based on the particular NAF or there may be pre-stored rules/instructions on the BSF 220 that address such changes. The UE authentication credentials may reference the AKA key material along with other communication session information. The BSF 220 then sends a message to the UE 210 that the UE authentication credentials have been augmented to have the authenticated identity information associated therewith.

The UE 210 sends a message to the NAF-A 230 requesting that the NAF-A 230) contact the BSF 220 to obtain the UE authentication credentials that are now associated with authenticated identity information (i.e., to obtain the augmented B-TID). The NAF-A 230 communicates with the BSF 220 to verify that the UE authentication credentials have the authenticated identity information associated therewith and any change to the lifespan/expiry time of the AKA protocol key material may also be communicated/confirmed.

Now that the additional identity information associated with the UE 210 has been authenticated and communicated to the NAF-A 230 the NAF-A 230 may provide the requested service/feature using the AKA protocol key material that is derived for securing the Ua interface between the UE 210 and the NAF-A 230. It will be understood that throughout the operations described above with respect to FIG. 3, the same B-TID may be used as the UE authentication credentials because the B-TID can be thought of as a reference or a file name. The file may contain additional information, but the file name does not change.

Figure 4:
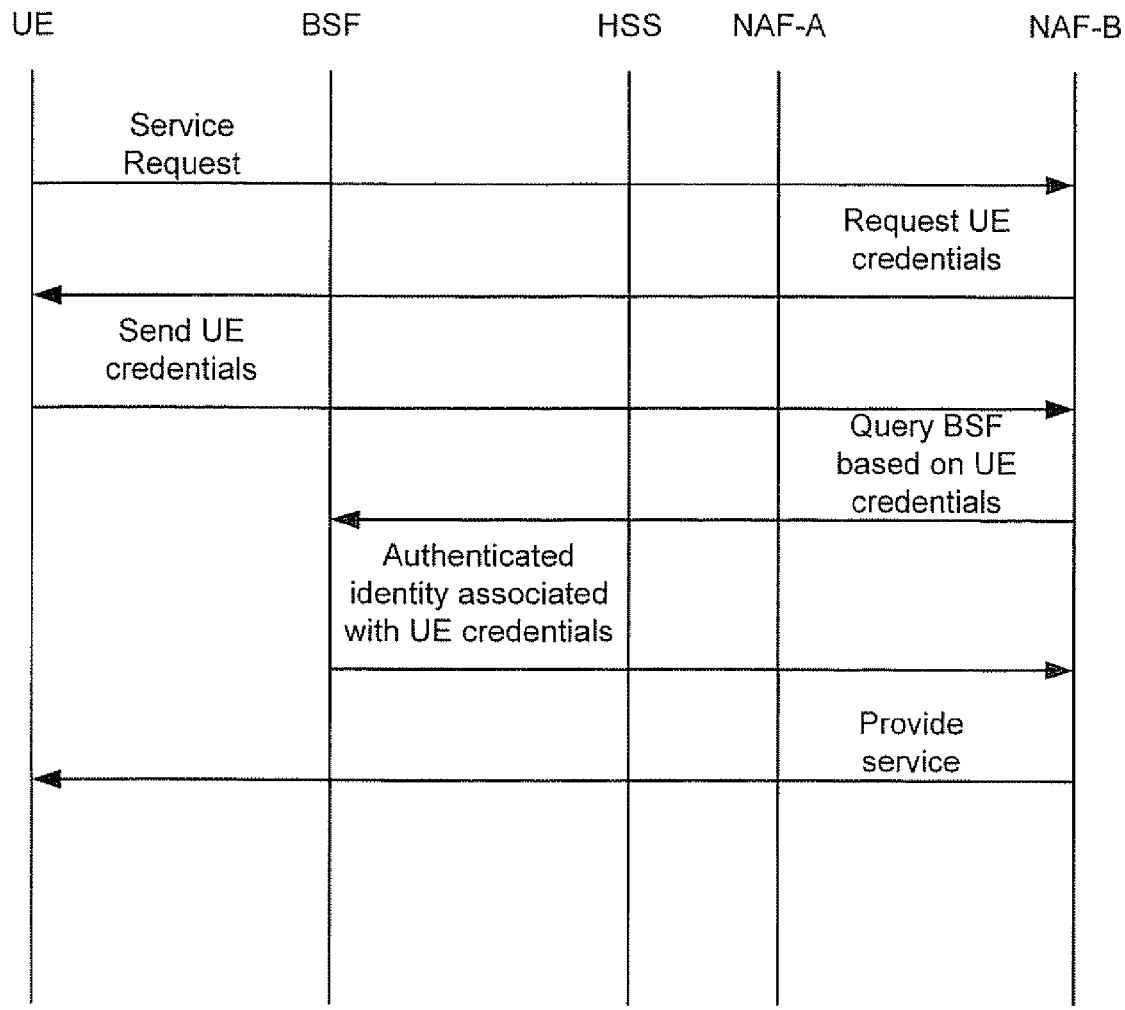

Some embodiments of the present invention may provide "single sign on" functionality in that once a UE and associated identity information have been authenticated for accessing one service or application, all of these authentication operations need not be repeated when accessing another service or application. This may be illustrated with respect to the message flow diagram of FIG. 4. Referring to FIG. 4 and FIG. 2, the UE 210, after having previously been authenticated to access a service or feature on NAF-A 230 that requires additional authentication beyond UE level or device level authentication, may send a request to the NAF-B 240 to access, for example, a Web or browser based service or feature that requires additional authentication. The NAF-B 240 requests the UE authentication credentials (e.g., B-TID) from the UE 210, which sends the credentials in response to the request. The NAF-B 240 uses the US authentication credentials to query the BSF 220 to obtain information associated with the UE authentication credentials including the associated authenticated identity information. The NAF-B 240 having received the authenticated identity information provides the requested service/application to the UE 210 without the need for a user to resubmit identity information. Instead, the NAF-B 240 is able to use the authenticated identity information that was generated from the previous session with the NAF-A 230.

Figure 5:
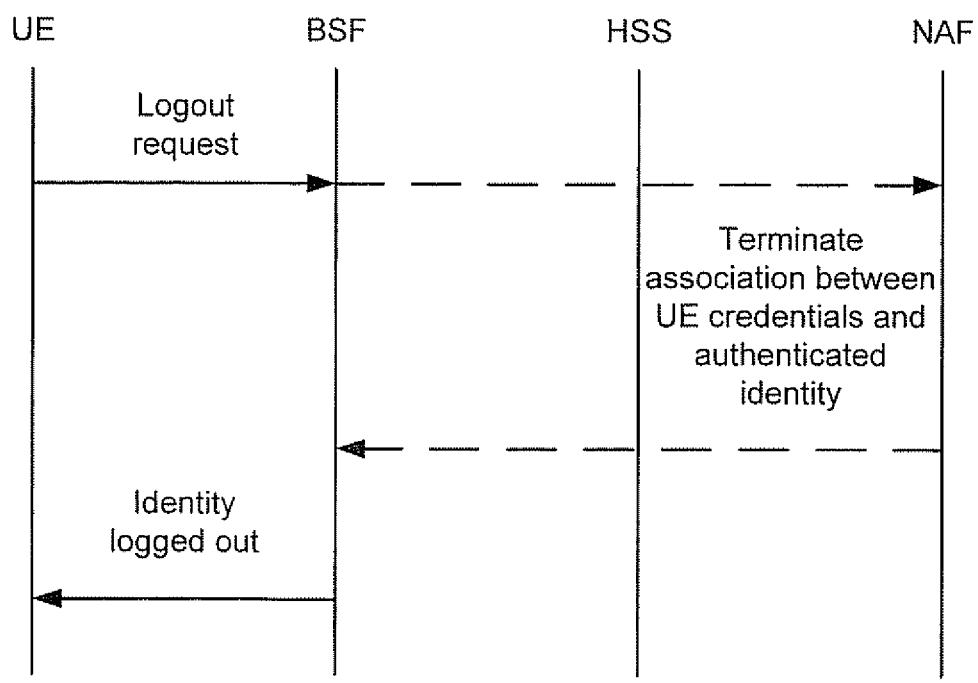

It may be relatively common for a user to loan his/her UE, such as a mobile terminal, to another person. In such a case, it may be desirable for the UE to remain authenticated at a device level on the network, but the user may wish to log out so that his/her authenticated identity information is no longer associated with the UE. This may be illustrated, for example, in the message flow diagram of FIG. 5. Referring to FIG. 5 and FIG. 7 the UE 210 sends a logout request message to the BSF 220 or the NAF-A 230. If the logout request message is sent to the NAF-A 230, then the NAF-A 230 forwards this message to the BSF 220, which instructs the BSF 220 to terminate the association between the UE credentials (e.g., B-TID) and the authenticated identity information. The BSF 220 then informs the UE 210 that the user has been logged out based on the particular identity information provided. A user may then allow others to use his/her UE without fear that another person may use his/her identity in making transactions, requesting services, etc.

Many variations and modifications can be made to the embodiments without substantially departing from the principles of the present invention. All such variations and modifications are intended to be included herein within the scope of the present invention, as set forth in the following claims.

That which is claimed:

1. A method of operating a communication network to provide access to a service, comprising:
    receiving a message at a bootstrapping server function from user equipment that additional authentication beyond user equipment authentication is required for user equipment access to a network service, the additional authentication comprising identity verification of an entity other than the user equipment; and
    performing an authentication protocol between the bootstrapping server function and a home subscriber system to authenticate an identity of the entity associated with the user equipment responsive to receiving the message;
    wherein performing the authentication protocol comprises:
    receiving user equipment authentication credentials from the user equipment at the bootstrapping server function;
    associating identity information with the user equipment authentication credentials at the bootstrapping server function; and
    informing the user equipment that the identity information has been associated with the user equipment authentication credentials.

2. The method of claim 1, wherein performing the authentication protocol further comprises:
    sending a prompt from the bootstrapping server function to the user equipment for the identity information;
    receiving the identity information from the user equipment at the bootstrapping server function; and
    sending the identity information and the user equipment authentication credentials to the home subscriber system.

3. The method of claim 2, wherein performing the authentication protocol further comprises:
    authenticating the identity information at the home subscriber system; and
    notifying the bootstrapping server function that the identity information has been authenticated.

4. The method of claim 3, wherein performing the authentication protocol further comprises:
    changing an expiration time of key material used to authenticate the user equipment.

5. The method of claim 4, wherein changing the expiration time of the key material comprises changing the expiration time of the key material based on instructions associated with a network application function that provides the network service and are stored on the home subscriber system.

6. The method of claim 4, further comprising:
    wherein the user equipment authentication credentials references the key material with the changed expiration time along with information associated with a communication session between the user equipment and a network application function that provides the network service.

7. The method of claim 3, further comprising:
    receiving a request initiated from the user equipment that the association between the user equipment authentication credentials and the authenticated identity information be terminated;
    terminating the association between the user equipment authentication credentials and the authenticated identity information at the bootstrapping server function; and
    notifying the user equipment that the association between the user equipment authentication credentials and the identity information has been terminated.

8. The method of claim 2, wherein the identity information comprises a user identification and a secure identification.

9. A method of operating user equipment to access a network service, comprising:
    sending a request for the network service from the user equipment to the network application function;
    receiving a message from the network application function at the user equipment that additional authentication beyond user equipment authentication is required to access to the network service, the additional authentication comprising identity verification of an entity other than the user equipment;
    sending identity information of the entity, which is associated with the user equipment, from the user equipment to a bootstrapping server function for authentication of the identity information;
    notifying the network application function that the bootstrapping server function contains user equipment authentication credentials that have the identity information associated with the user equipment authentication credentials; and receiving notice the user equipment that the identity information has been associated with the user equipment authentication credentials.

10. The method of claim 9, wherein sending the identity information comprises:

notifying the bootstrapping server function that the additional authentication for accessing the network service is required;

sending the user equipment authentication credentials to the bootstrapping server function;

receiving a prompt from the bootstrapping server function for the identity information; and sending the identity information responsive to receiving the prompt.

11. The method of claim 9, wherein the identity information comprises a user identification and a secure identification.

12. The method of claim 9, further comprising:

requesting that the association between the user equipment authentication credentials and the identity information be terminated; and receiving notification that the bootstrapping server function has terminated the association between the user equipment authentication credentials and the identity information.

* * * * *